United States Patent
Aguilera Diez et al.

(10) Patent No.: US 10,133,672 B2
(45) Date of Patent: Nov. 20, 2018

(54) SYSTEM AND METHOD FOR EFFICIENT POINTER CHASING

(71) Applicant: Advanced Micro Devices, Inc., Sunnyvale, CA (US)

(72) Inventors: Paula Aguilera Diez, San Jose, CA (US); Amin Farmahini-Farahani, Sunnyvale, CA (US); Nuwan Jayasena, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 105 days.

(21) Appl. No.: 15/267,097

(22) Filed: Sep. 15, 2016

(65) Prior Publication Data

US 2018/0074965 A1     Mar. 15, 2018

(51) Int. Cl.
*G06F 12/00*     (2006.01)
*G06F 12/0864*   (2016.01)
*G06F 12/0804*   (2016.01)

(52) U.S. Cl.
CPC ...... *G06F 12/0864* (2013.01); *G06F 12/0804* (2013.01); *G06F 2212/1008* (2013.01); *G06F 2212/1021* (2013.01); *G06F 2212/608* (2013.01)

(58) Field of Classification Search
CPC ............ G06F 12/0804; G06F 12/0864; G06F 2212/1008; G06F 2212/1021; G06F 2212/608

See application file for complete search history.

(56) References Cited

U.S. PATENT DOCUMENTS 8,886,917 B1 *   11/2014   Binkert ................. G06F 9/50
                                                          712/32

\* cited by examiner

*Primary Examiner* — Yong Choe
(74) *Attorney, Agent, or Firm* — Volpe and Koenig, P.C.

(57) ABSTRACT

Described is a system and method for efficient pointer chasing in systems having a single memory node or a network of memory nodes. In particular, a pointer chasing command is sent along with a memory request by an issuing node to a memory node. The pointer chasing command indicates the number of interdependent memory accesses and information needed for the identified interdependent memory accesses. An address computing unit associated with the memory node determines the relevant memory address for an interdependent memory access absent further interaction with the issuing node or without having to return to the issuing node.

22 Claims, 5 Drawing Sheets

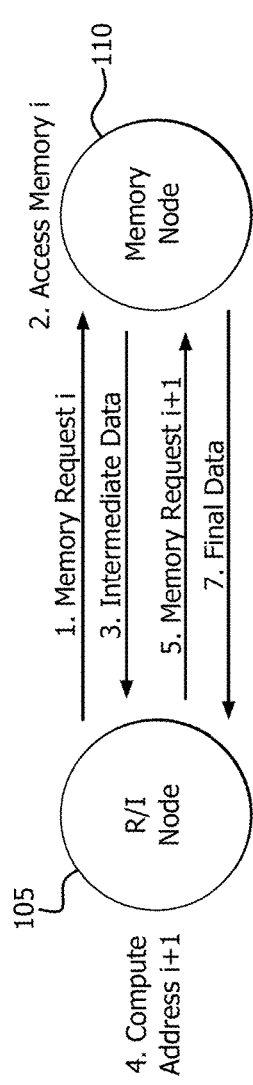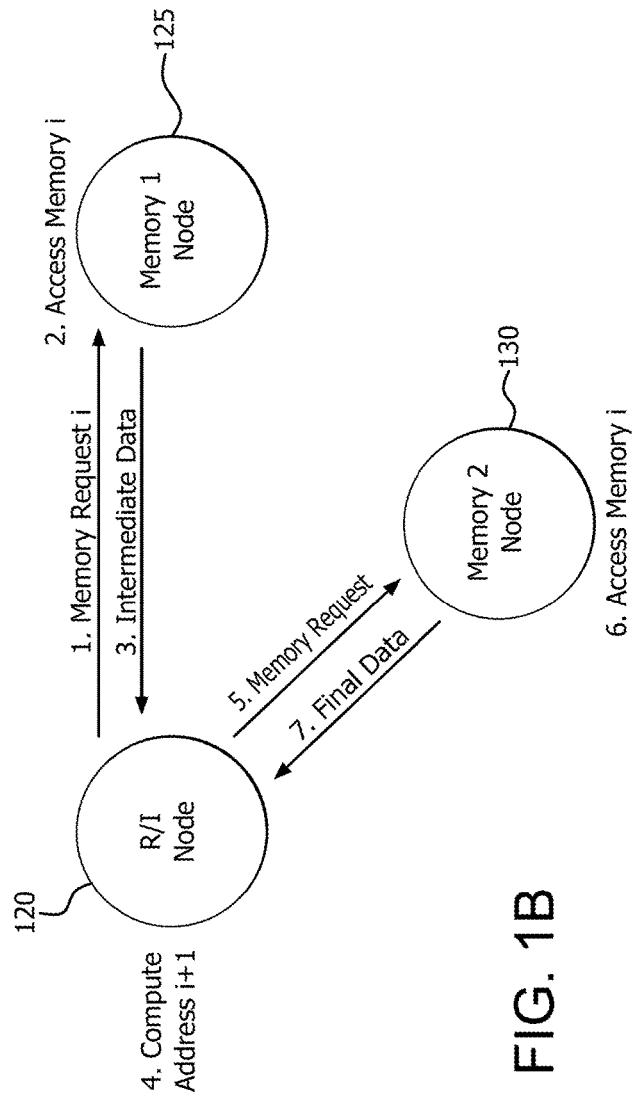

SYSTEM AND METHOD FOR EFFICIENT POINTER CHASING

GOVERNMENT RIGHTS CLAUSE

This invention was made with Government support under Prime Contract Number DE-AC52-07NA27344, Subcontract No. B608045 awarded by DOE. The Government has certain rights in this invention.

BACKGROUND

Many important application domains such as data clustering, social networking, in-memory databases, and machine learning perform a large amount of "pointer chasing" in their code, while traversing pointer-based data structures such as graphs and trees. In general, pointer chasing refers to the operation of accessing multiple memory locations where each access to a new memory location holds a pointer to the next one. This prevents the second access from proceeding until the first access is complete. Pointer chasing affects performance because memory reads are, in effect, serialized in the compute nodes. That is, a read (for example a load instruction) may be not be initiated until the prior read is completed because the prior load instruction provides the address for the next load instruction. Compute nodes in these systems issue requests to memory nodes that can require multiple round trips to one or more memory nodes, incurring large latency overhead. Pointer chasing is a high-latency operation because of the interdependency between load instructions and can result in large performance degradation in systems with multiple memory nodes, and even in systems that have a single memory node.

BRIEF DESCRIPTION OF THE DRAWINGS

A more detailed understanding may be had from the following description, given by way of example in conjunction with the accompanying drawings wherein:

FIG. 1A is a flow diagram illustrating interdependent memory accesses to a same memory;

FIG. 1B is a flow diagram illustrating interdependent memory accesses to different memories;

DETAILED DESCRIPTION

Figure 2:
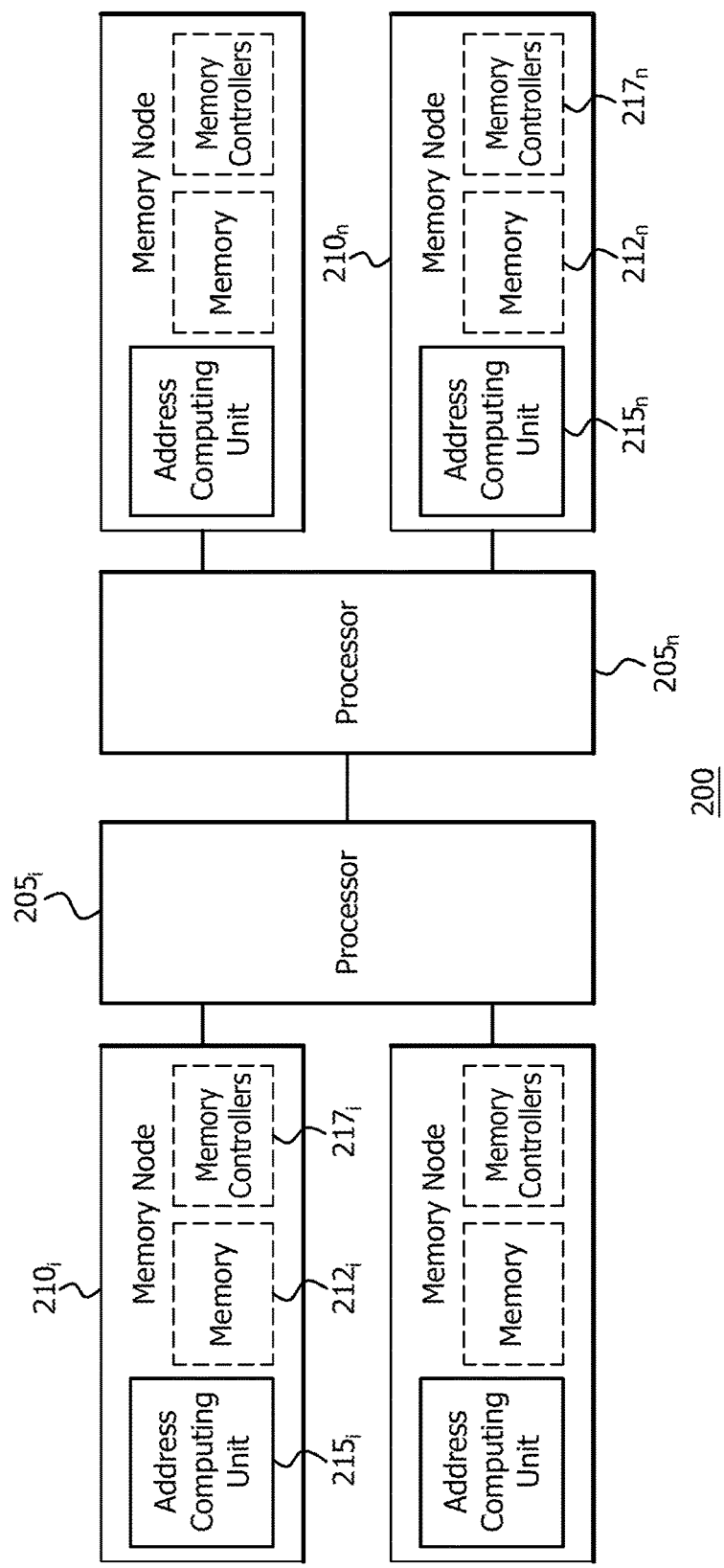
FIG. 2 is a high level block diagram of a system that includes compute nodes and memory nodes with address computing units/address computing capability in accordance with certain implementations.

Pointer chasing refers to the operation of accessing multiple memory locations where each access to a new memory location holds a pointer to the next memory location. This prevents a second access from proceeding until a first access is complete. In systems that have multiple memory nodes, where processors (along with processing-in-memory (PIM) and processing near memory (PNM) architectures) have a non-uniform memory access (NUMA) view of the memory, pointer chasing to non-local memory nodes can result in high performance degradation as each memory access needs to wait for the previous one to finish and multiple round trips are incurred to one or more remote memory nodes as illustrated below with respect to FIGS. 1A and 1B. Pointer chasing is a common operation when accessing data structures such as linked lists and graphs.

A common case for pointer chasing is done when traversing a graph. A frequently used approach for representing a graph is to use separate arrays for the vertices and the edges. As shown in the example code below, the vertex array is indexed with the vertex id, and the content in that location (i.e., neighbors_start) is the starting position in the edge array where the neighbors of that vertex are stored.

(1) neighbors_start=vertex_array [vertex_id];
(2) neighbor=edge_array[neighbors_start];

The above example shows just two interdependent memory accesses, but pointer chasing can consist of two or more interdependent accesses, such as in the case of traversing a linked-list. Moreover, in a network with multiple memory nodes, the data structures can be distributed among multiple memory nodes.

FIG. 1A illustrates pointer chasing between a requesting node or an issuing node 105 (hereinafter a requesting/issuing (R/I) node) and a memory node 110. In particular, FIG. 1A illustrates interdependent memory accesses to a same memory node. Initially, the requesting/issuing node 105 sends a first memory request to the memory node 110 (process 1). The memory node 110 performs the memory access (process 2) and sends the requested (intermediate) data back to the requesting/issuing node 105 (process 3). Once the requesting/issuing node 105 obtains the requested data, the requesting/issuing node 105 computes the address of the dependent memory access (process 4) and sends a new, dependent memory request to the memory node 110 (process 5). The memory node 110 performs the memory access for the dependent memory request (process 6) and sends the requested data (e.g., final data in this instance), back to the requesting/issuing node 105 (process 7).

FIG. 1B illustrates pointer chasing between a requesting/issuing node 120, a memory 1 node 125, and a memory 2 node 130. In particular, FIG. 1B illustrates interdependent memory accesses to different memory nodes. Initially, the requesting/issuing node 120 sends a first memory request to the memory 1 node 125 (process 1). The memory 1 node 125 performs the memory access (process 2) and sends the requested (intermediate) data back to the requesting/issuing node 120 (process 3). Once the requesting/issuing node 120 obtains the requested data, the requesting/issuing node 120 computes the address of the dependent memory access (process 4) and sends a new, dependent memory request to the memory 2 node 130 (process 5). The memory 2 node 130 performs the memory access for the dependent memory request (process 6) and sends the requested data (e.g., final data in this instance) back to the requesting/issuing node 120 (process 7).

As shown in FIGS. 1A and 1B, if a requesting/issuing node performs memory accesses to one or more memory nodes, multiple round trips are incurred. In particular, pointer chasing incurs dependent memory accesses that require each memory request to complete before being able to issue a new memory request. In a system with multiple memory nodes, when the interdependent memory accesses are to remote or non-local memory nodes, pointer chasing results in multiple round trips to one or more remote memory nodes, which ends up incurring even higher performance penalties. Even in systems with a single memory node, dependent memory accesses result in sending commands and data back and forth between the requesting/issuing node and memory node. These are high-latency operations and hurt performance considerably due to dependent accesses.

Efficient implementation of pointer chasing over a network of memory nodes can result in significant performance improvement of many diverse applications, and particularly applications that require accessing and modifying data structures such as graphs or linked lists. The capability to prevent these round trips and instead issuing an initial request and getting the final result would result in low-latency and bandwidth savings on the memory bus/interface.

Described is a system and method for efficient pointer chasing in systems having a single memory node or a network of memory nodes. In particular, a pointer chasing command is sent along with a memory request by a requesting/issuing node to a memory node. The pointer chasing command indicates the number of interdependent memory accesses, and includes information needed for the identified interdependent memory accesses. An address computing unit (or address computing capability) associated with the memory node determines the relevant memory address for an interdependent memory access absent further interaction with the requesting/issuing node or without having to return to the requesting/issuing node.

In general, the system and method enable commands that communicate pointer chasing information (e.g., at least interdependent memory addresses) to one or more memory nodes without returning to the requesting/issuing node in between memory accesses. This reduces round trip latency issues. The system and method provide support for interdependent memory access to multiple memory nodes within a memory network and provides techniques for applying the above mechanisms using virtual or physical addresses and in systems that do or do not support cache coherence for in-memory operations.

Figure 4:
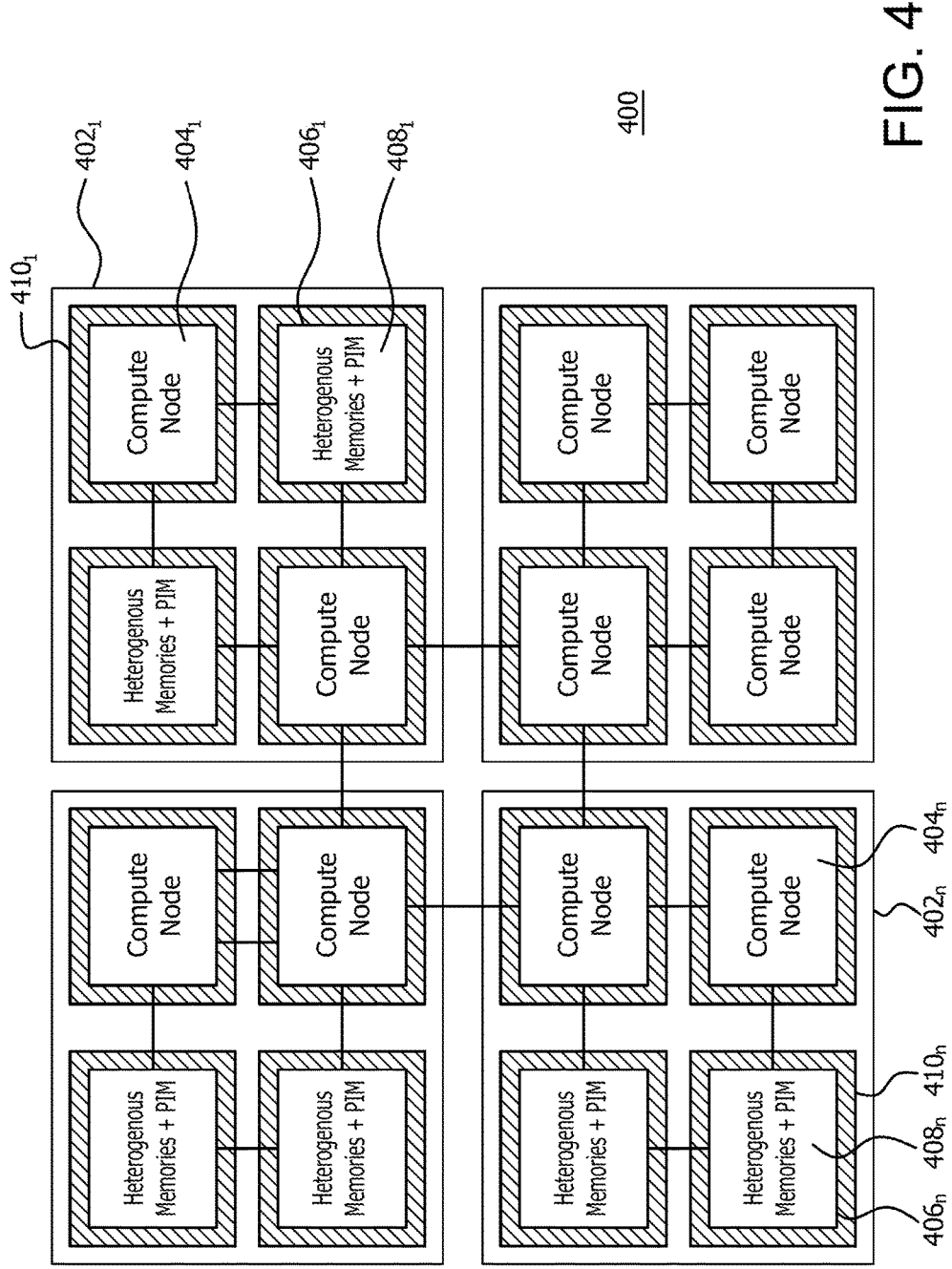
FIG. 4 is a high level block diagram of a network that includes compute nodes and memory nodes with address computing units/address computing capability in accordance with certain implementations.

FIG. 2 is a high level block diagram of a system 200 that includes processors $205_1$ to $205_n$, memory nodes $210_1$ to $210_n$, and address computing units $215_1$ to $215_n$ which are associated with each memory node $210_1$ to $210_n$ in accordance with certain implementations. In an implementation, the system 200 can be a network. Each of the processors $205_1$ to $205_n$ can be a central processing unit (CPU), graphics processing unit (GPU), accelerated processing unit (APU), field-programmable gate array (FPGA), compute unit/element or any device that executes commands or instructions and sends memory requests. Each of the memory nodes $210_1$ to $210_n$ can include: 1) a memory, a volatile or non-volatile memory, random access memory (RAM), dynamic RAM, a cache, or any similar device (denoted $212_1$ to $212_n$); 2) one or more address computing units $215_1$ to $215_n$ that provide address computing capabilities or smart intelligence; 3) one or more memory controllers $217_1$ to $217_n$ associated with each memory node $210_1$ to $210_n$; 4) interface controllers between chips (as shown in FIG. 4); and 5) processor in-memory (PIM) devices, processing-near-memory (PNM) devices (as shown in FIG. 4) or any similar devices. Although the address computing units $215_1$ to $215_n$ are shown as part of the memory nodes $210_1$ to $210_n$ this is illustrative only. The address computing units $215_1$ to $215_n$ and memory nodes $210_1$ to $210_n$ may be separate, integrated, collocated or in a similarly associated configuration. In an implementation, the address computing units $215_1$ to $215_n$ are at or near the memory nodes $210_1$ to $210_n$. In another implementation, the address computing units $215_1$ to $215_n$ or address computing capability is integrated in memory controllers $217_1$ to $217_n$, interface controllers, processors $205_1$ to $205_n$, and PIM devices.

In general, a pointer chasing command is piggybacked onto a memory request from the requesting/issuing or source node (hereinafter "requesting/issuing node) to a memory node. As an example, the pointer chasing commands are issued with respect to an initial memory request from a requesting/issuing or source node (for example, one of the processors $205_1$ to $205_n$) to one of the memory nodes $210_1$ to $210_n$. The pointer chasing command indicates that there is a dependent memory access. An address computing unit $215_1$ to $215_n$ associated with the memory node $210_1$ to $210_n$ computes the dependent memory address and satisfies the memory request or redirects it to the corresponding memory node based on the computed memory address, without having to return to the requesting/issuing node (in this example, one of the processors $205_1$ to $205_n$). In another example, an intelligent memory node (e.g., a PIM or PNM) triggers these pointer chasing commands and therefore the requesting/issuing node and a final destination node of the pointer chasing commands are intelligent memory nodes. That is, the requesting/issuing node may be a processor, an intelligent memory node or any similar device.

The pointer chasing command can contain additional information related to the dependent memory access. In an implementation, the pointer chasing command includes the number of interdependent memory accesses. That is, there are multiple dependent memory accesses before the final data is sent to a destination node (for example, one of the processors $205_1$ to $205_n$).

In another implementation, the pointer chasing command includes a field that indicates how the intermediate memory accesses are performed. This lets the address computing units $215_1$ to $215_n$ know if the pointer chasing command includes base addresses for the computation of the next addresses (e.g., for array indexing as described above with respect to the vertex_array and edge_array) or not (e.g., for linked-lists).

In an implementation using base addresses for the intermediate memory accesses (i.e., the dependent memory accesses), all subsequent memory accesses use the same base address (i.e., only a single base address is communicated with the pointer chasing command). In other implementations using base addresses for the intermediate memory accesses, a separate base address is included in the pointer chasing command for each subsequent memory access. In other implementations using base addresses for the intermediate memory accesses, both types of base address provisioning are used. In each of the base address implementations described, each time the pointer chasing command is resent to a new memory node, the base addresses corresponding to an already serviced memory access are removed, making the pointer chasing command shorter and reducing the required network bandwidth for the pointer chasing command.

In another implementation, the pointer chasing command includes a field that represents identification of a destination node to which the last memory node should send the final data. The destination node is the requesting/issuing node, a different node, or any other similar device.

In computing the addresses, consideration needs to be given as to how and where address translation is done. Data at a memory node is accessed via a physical address. A memory interface (which is used for communication between memory nodes in a network of memory nodes) uses either virtual addresses or physical addresses. However, the pointer chasing commands use virtual addresses for specifying the base address of the interdependent memory accesses, since to access a data element in an array, a target virtual address needs to be computed by adding the base address to the offset. This is done using virtual addresses. In the implementations described herein, it is assumed that the address computing unit within each memory node performs virtual to physical address translation.

In an implementation, memory interfaces in the system use physical addresses for communication between the memory nodes. In this case, the node that initiates a pointer chasing command, or the intermediate nodes that perform pointer chasing, are in charge of computing the memory address of the next memory access and translating the virtual address to a physical address before redirecting the request to the corresponding memory node.

In an implementation, memory interfaces in the system use virtual addresses for communication between the memory nodes. In this case, the node that initiates a pointer chasing command, or the intermediate nodes that perform pointer chasing, is in charge of computing the virtual memory address of the next memory access while the translation from virtual to physical addresses is done at the destination memory node where the data is accessed. In this implementation, it is assumed that the target node of a memory address is determined from the virtual address. An example of systems in which virtual addresses are used for memory requests is when the nodes cannot translate virtual addresses to physical addresses of remote memory locations (i.e., the memory is not local to the requesting/issuing node). In other implementations where virtual address translation is not supported in memory nodes, pointer chasing commands are constrained to only access data within regions or segments of memory that are contiguous in both virtual and physical address spaces.

In computing the addresses, consideration also needs to be given as to how caches are to be handled. In an implementation, data structures that can use pointer chasing commands place all addresses (pointers) in un-cacheable address segments. This improves efficiency in cases where cache hit rates are extremely low due to irregular accesses to large data structures. In another implementation, data structures that use pointer chasing commands can ensure that the data structures are read-only after initialization (which is often the case, for example, with large graph processing applications).

In an implementation where systems use caches and support cache coherency, any new memory accesses are factored into the cache coherence mechanisms to ensure that the most up-to-date version of data (which can reside in caches of any requesting/issuing node, PIM or PNM) is used by the memory nodes. In systems incorporating PIMs that are cache-coherent with the host requesting/issuing nodes or other PIMs, the cache coherence mechanism takes care of utilizing the most up-to-date copy of the data that might be in the PIM or the host requesting/issuing node's caches. When issuing a memory request, any memory accesses that hit in the issuing PIM's or requesting/issuing node's caches are serviced by the cache controller of the PIM and/or host requesting/issuing node (including the orchestration of dependent accesses as described herein). The remaining portion of the memory access sequence is issued to the memory system for processing as described herein.

In an implementation where systems use caches but do not support cache coherency between requesting/issuing nodes and operations within memory nodes, when a pointer chasing operation occurs in a cached data structure that might not be clean, the caches are flushed prior to pointer chasing. This is feasible in applications where updates to the pointers occur only during initialization or in well-defined phases. In these cases, the cache flushes only occur at the end of initialization or at the end of phases where pointers are updated. In an implementation, flushing occurs between requesting/issuing nodes and memory nodes.

Figure 3A:
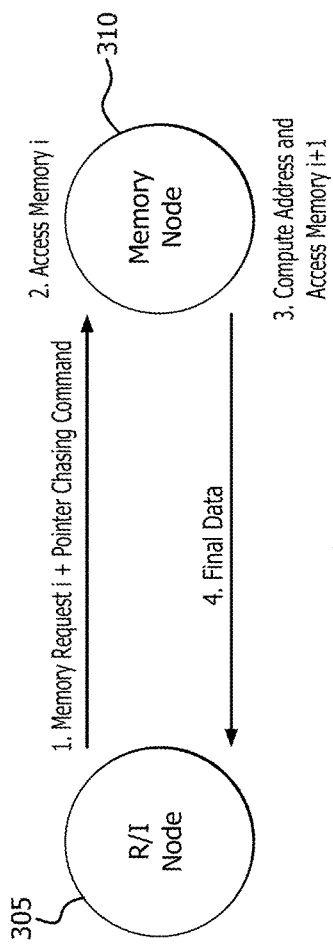
FIG. 3A is a flow diagram illustrating a pointer chasing command for interdependent memory accesses to a same memory having an address computing unit/address computing capability in accordance with certain implementations.

FIG. 3A illustrates pointer chasing between a requesting/issuing node 305 and a memory node 310 having address computing capabilities in accordance with certain implementations. In particular, FIG. 3A illustrates interdependent memory accesses to a same memory node 310 having address computing capabilities. Although this description is for a case with only a single dereferencing in the memory node 310, the pointer chasing command and method are applicable to cases where an arbitrary number of dereferencing pointer chasing commands are piggybacked on the original pointer chasing command and are served across multiple memory nodes. As noted herein, the base addresses of each memory access are deleted upon completion and prior to sending to the next node. In addition, the number of interdependent memory accesses is decremented before sending to the next node. Although the examples illustrate the requesting/issuing node as the initiating node and the destination node, the requesting/issuing node and the destination node can be different nodes.

Initially, the requesting/issuing node 305 sends a first memory request with the address to be accessed plus a pointer chasing command to indicate any interdependent memory accesses to the memory node 310 (process 1). The memory node 310 performs the first memory access (process 2) and computes the second address that needs to be accessed and accesses that location itself (now the second memory access) (process 3). After completion of the second memory access by the memory node 310, the final data is sent to the requesting/issuing node 305 (process 4). As described herein, the computation of the second memory address is performed at an address computing unit associated with the memory node 310. The dependent memory address is computed by adding the base address to the offset read by the first memory access (e.g., for the graph traversal case), or in other cases like a linked list traversal, the first memory access returns the pointer to the memory location that needs to be accessed next.

Figure 3B:
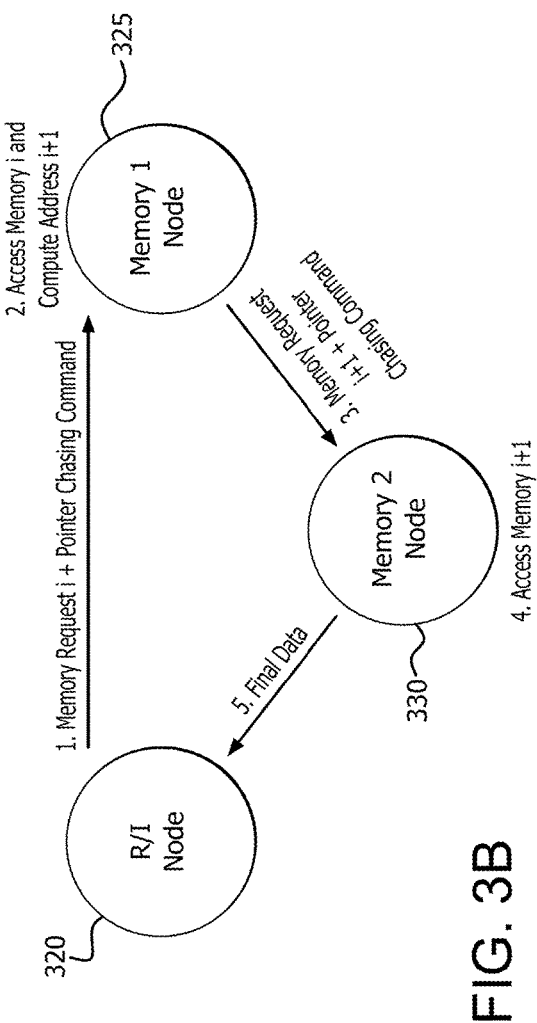
FIG. 3B is a flow diagram illustrating a pointer chasing command for interdependent memory accesses to different memories with an address computing unit/address computing capability in accordance with certain implementations.

FIG. 3B illustrates pointer chasing between a requesting/issuing node 320, a memory 1 node 325 and a memory 2 node 330. In particular, FIG. 3B illustrates interdependent memory accesses to different memory nodes. Initially, a requesting/issuing node 320 sends a first memory request with the address to be accessed plus a pointer chasing command to indicate any interdependent memory accesses to the memory 1 node 325 (process 1). The memory 1 node 325 performs the first memory access and computes the second address that needs to be accessed (process 2) and directs the second memory request with a second pointer chasing command to the memory 2 node 330 (process 3). As noted herein, the base address (if any) used for the first memory access is deleted prior to sending the second memory request and the second pointer chasing command. After completion of the second memory access by the memory 2 node 330 (process 4), the final data is sent to the requesting/issuing node 320 (process 5).

FIG. 4 is another high level block diagram of a network 400 that implements the pointer chasing command and method described herein. The network 400 includes multiple modules $402_1$ to $402_n$, where each module $402_1$ to $402_n$ includes compute nodes $404_1$ to $404_n$ (e.g., a requesting/issuing node), and memory nodes $406_1$ to $406_n$. In an implementation, each of the multiple modules $402_1$ to $402_n$ are multiple chips. Each of the compute nodes $404_1$ to $404_n$ may be a processor, central processing unit (CPU), graphics processing unit (GPU), accelerated processing unit (APU), field-programmable gate array (FPGA), compute unit/element or any device that executes commands or instructions and sends memory requests. Without limiting the description above with respect to FIG. 2, each of the memory nodes $406_1$ to $406_n$ includes, but is not limited to: 1) a memory, a volatile or non-volatile memory, random access memory (RAM), dynamic RAM, a cache, or any similar device; 2) an associated address computing element; and 3) PIM or PNM devices $408_1$ to $408_n$, to provide compute capabilities at each memory node $406_1$ to $406_n$. In an implementation, the memory nodes $406_1$ to $406_n$ include an interface controller $410_1$ to $410_n$.

In the network 400, each compute node $404_1$ to $404_n$ executes instructions or commands that require memory accesses to any of memory nodes $406_1$ to $406_n$. For example, compute node $404_1$ sends a memory request along with a pointer chasing command to memory node $406_1$ (a local memory node) or to memory node $406_n$ (a remote or non-local memory node). Each of the memory nodes $406_1$ to $406_n$ and PIM or PNM devices $408_1$ to $408_n$ together serve high-level commands such as loads and stores and pointer chasing commands, instead of supporting lower level commands such as row activations and column accesses in traditional DRAM interfaces. In this case, the address computing unit or address computing capability within the PIM or PNM devices $408_1$ to $408_n$ compute the address pursuant to the pointer chasing command.

Although the description herein is for a system where pointer chasing is performed in the memory nodes, the method is also applicable to other forms of NUMA systems where the pointer chasing is performed by the memory controller (an illustrative address computing element) of the compute node closest to the memory node being accessed (i.e., the operations described as occurring on the memory node here may occur on the memory controller of the compute node closest to the memory node).

Figure 5:
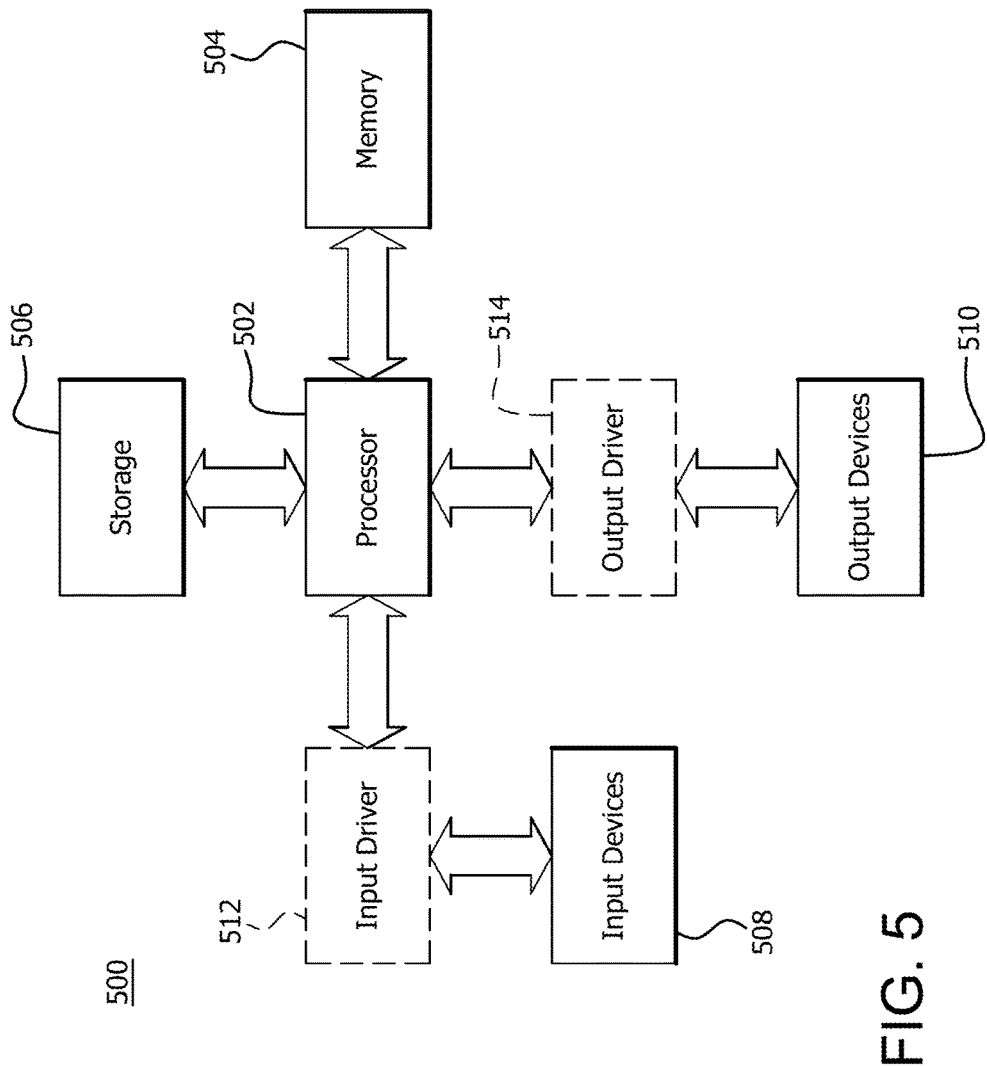
FIG. 5 is a block diagram of an example device in which one or more disclosed implementations may be implemented.

FIG. 5 is a block diagram of an example device 500 in which one or more portions of one or more disclosed examples can be implemented. The device 500 includes, for example, a head mounted device, a server, a computer, a gaming device, a handheld device, a set-top box, a television, a mobile phone, or a tablet computer. The device 500 includes a compute node or processor 502, a memory 504, a storage 506, one or more input devices 508, and one or more output devices 510. The device 500 also optionally includes an input driver 512 and an output driver 514. It is understood that the device 500 includes additional components not shown in FIG. 5.

The compute node or processor 502 can include a central processing unit (CPU), a graphics processing unit (GPU), a CPU and GPU located on the same die, or one or more processor cores, wherein each processor core can be a CPU or a GPU. The memory 504 is located on the same die as the compute node or processor 502, or is located separately from the compute node or processor 502. The memory 504 includes a volatile or non-volatile memory, for example, random access memory (RAM), dynamic RAM, or a cache.

The storage 506 includes a fixed or removable storage, for example, a hard disk drive, a solid state drive, an optical disk, or a flash drive. The input devices 508 includes a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 include a display, a speaker, a printer, a haptic feedback device, one or more lights, an antenna, or a network connection (e.g., a wireless local area network card for transmission and/or reception of wireless IEEE 802 signals).

The input driver 512 communicates with the compute node or processor 502 and the input devices 508, and permits the compute node or processor 502 to receive input from the input devices 508. The output driver 514 communicates with the compute node or processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In general, described herein is a system and method for efficient pointer chasing which includes an issuing node for sending a memory request with a pointer chasing command to a memory node. The system also includes an address computing unit which determines, absent further interaction with the issuing node, a memory address for an interdependent memory access using at least the pointer chasing command. The pointer chasing command indicates a number of interdependent memory accesses and information needed for performing each of the interdependent memory accesses. The information indicates how each interdependent memory access is performed and can include a field indicating whether the pointer chasing command includes at least one base address. Each interdependent memory access uses a same base address or different base addresses. In an implementation, the base address is deleted for a serviced interdependent memory access. In an implementation, a cache is flushed prior to performing pointer chasing operations. In an implementation, a plurality of pointer chasing commands are included with the pointer chasing command, each of the plurality of pointer chasing commands being served across a plurality of memory nodes. In an implementation, the number of interdependent memory accesses is decremented prior to sending the pointer chasing command to a next node. In an implementation, the address computing unit is integrated with the memory node.

In general and without limiting implementations described herein, a computer readable non-transitory medium including instructions which when executed in a processing system cause the processing system to execute a method for efficient pointer chasing.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for pointer chasing that improves performance of data retrieval from a memory, the system comprising:
    an issuing node for sending a memory request with a pointer chasing command to a memory node, wherein the pointer chasing command indicates a number of interdependent memory accesses and information needed for performing each of the interdependent memory accesses; and
    an address computing unit associated with the memory node, wherein the address computing unit determines, absent further interaction with the issuing node, a memory address for an interdependent memory access using the pointer chasing command.

2. The system of claim 1, wherein the memory node includes at least one of a memory controller, an interface controller, a processor in memory device and a processing-near-memory device.

3. The system of claim 1, wherein the information indicates how each interdependent memory access is performed.

4. The system of claim 3, wherein the information includes a field indicating whether the pointer chasing command includes at least one base address.

5. The system of claim 4, wherein each interdependent memory access uses one of a same base address or different base address.

6. The system of claim 4, wherein a base address is deleted for a serviced interdependent memory access.

7. The system of claim 1, wherein a cache is flushed prior to performing pointer chasing operations.

8. The system of claim 1, wherein a plurality of pointer chasing commands are included with the pointer chasing command, each of the plurality of pointer chasing commands being served across a plurality of memory nodes.

9. The system of claim 1, wherein the number of interdependent memory accesses is decremented prior to sending the pointer chasing command to a next node.

10. The system of claim 1, wherein the address computing unit is integrated with the memory node.

11. The system of claim 1, wherein data is retrieved based on the memory address.

12. A method for pointer chasing that improves performance of data retrieval from a memory, the method comprising:
    receiving a memory request with a pointer chasing command from an issuing node at a memory node, wherein the pointer chasing command indicates a number of interdependent memory accesses and information needed for performing each of the interdependent memory accesses; and
    determining, at an address computing unit associated with the memory node, absent further interaction with the issuing node, a memory address for an interdependent memory access using the pointer chasing command.

13. The method of claim 12, wherein the memory node includes at least one of memory controllers, interface controllers, processor in memory devices and processing-near-memory devices.

14. The method of claim 12, wherein the information indicates how each interdependent memory access is performed.

15. The method of claim 14, wherein the information includes a field indicating whether the pointer chasing command includes at least one base address.

16. The method of claim 15, wherein each interdependent memory access uses a same base address.

17. The method of claim 15, further comprising:
    deleting a base address for a serviced interdependent memory access.

18. The method of claim 12, further comprising:
    flushing a cache prior to performing pointer chasing operations.

19. The method of claim 12, wherein a plurality of pointer chasing commands are included with the pointer chasing command, each of the plurality of pointer chasing commands being served across a plurality of memory nodes.

20. The method of claim 12, further comprising:
    decrementing by one the number of interdependent memory accesses prior to sending the pointer chasing command to a next node.

21. The method of claim 15, wherein each interdependent memory access uses a different base address.

22. The method of claim 12, further comprising:
    retrieving data based on the memory address.

* * * * *